Patented July 27, 1948

2,445,939

UNITED STATES PATENT OFFICE 2,445,939

METAL SALTS OF ACYL PHENOL MONOSULFIDES

Elmer W. Cook, New York, N. Y., and William D. Thomas, Jr., Stamford, Conn., assignors to American Cyanamid Company, New York, N. Y., a corporation of Maine No Drawing. Application October 31, 1941, Serial No. 417,310

6 Claims. (Cl. 260—592)

This invention relates to new chemical compounds and their preparation; more particularly to acyl phenol monosulfides and metal salts thereof.

The acyl phenol monosulfides to be described and claimed herein by us may be represented by the general formula

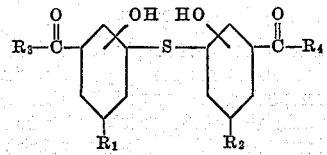

in which $R_1$ and $R_2$ are alkyl groups having 1 to 20 carbon atoms and $R_3$ and $R_4$ are members of the group consisting of alkyl, aryl, alkoxyalkyl, aroxyalkyl, aralkyl, alkaryl and cycloalkyl radicals. The metal salts of these compounds are also included within the scope of our invention as set forth in the appended claims.

The acyl phenol monosulfides and metal salts thereof show detergent properties in mineral oils in which they are readily soluble and may be employed to great advantage therein in the preparation of heavy duty crankcase oils. Oils treated with the compounds of the present invention are slow to form sludge under conditions of heavy duty service. Varnish formation and ring sticking is also reduced to a minimum in the engine. These compounds are also of value in lubricating oils as pour point depressants and because of their oiliness properties. Some of the metal salts such as those of lead, zinc, mercury, cadmium, copper, etc. are valuable in the preparation of insecticides and in the mildew-proofing of fabrics. Other salts such as the sodium salt may be employed as mordants. They are also valuable as intermediates in the preparation of wetting agents and may be used directly as plasticizers.

The acyl phenol monosulfides of our invention are prepared by acylating an alkyl-substituted phenol monosulfide with an acyl halide in the presence of anhydrous aluminum chloride. The reaction whereby our acyl phenol monosulfides are prepared may be carried out with several modifications. For example, we may react a suitable alkyl-substituted phenol monosulfide with an acyl halide and heat the mixture until the evolution of hydrogen chloride has stopped. This reaction is as follows:

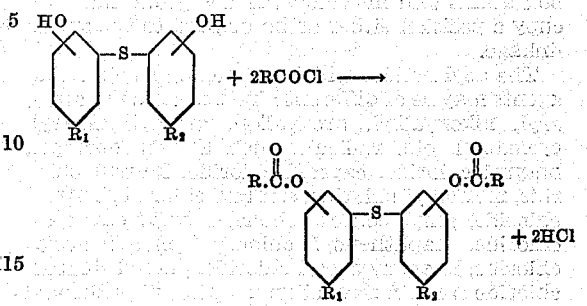

We may then add a quantity of anhydrous aluminum chloride corresponding to about ⅔ of a mole for each mole of the alkyl-substituted phenol monosulfide employed and continue the heating until hydrogen chloride ceases to come off from the reaction mixture. The product thus obtained is probably a complex aluminum salt of an acyl phenol monosulfide. This complex aluminum salt is then decomposed by the addition of a quantity of cold dilute hydrochloric acid to liberate the acyl phenol monosulfide which may be separated from the reaction mixture by extraction with a solvent followed by washing with water and evaporation of the solvent. Although we prefer to use hydrochloric acid to decompose the complex aluminum salt other moderately strong acids such as sulfuric, acetic, formic, etc. may be used. The product thus obtained is believed to have the formula:

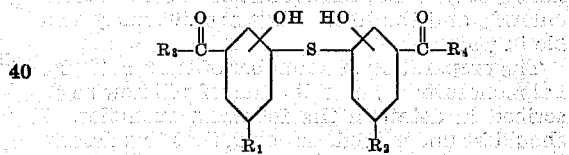

in which $R_1$, $R_2$, $R_3$ and $R_4$ are as described above.

Instead of carrying out the reaction in two stages we may mix the alkyl phenol monosulfide with an acyl halide and the anhydrous aluminum chloride at the same time and heat until hydrogen chloride is no longer evolved from the reaction mixture. The complex aluminum salt obtained is then decomposed with cold dilute hydrochloric acid or other acid as described above. We may also prepare these compounds by reacting first the alkyl phenol monosulfide with anhydrous aluminum chloride followed by reaction with the appropriate acylating agent.

In carrying out the above described reactions we prefer to dilute the reactants with an inert solvent such as nitrobenzene, carbon disulfide or petroleum naphtha in order to thin the reaction mixture so that it may be easily stirred, poured, etc. and to enable the heat of reaction to be absorbed without undue temperature rise. This procedure is, however, more a matter of convenience than necessity.

The alkyl-substituted phenol monosulfides which we employ in our reaction are well known products having the general formula

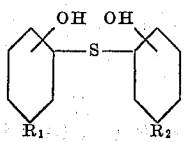

in which $R_1$ and $R_2$ are alkyl radicals of 1-20 carbon atoms and in which the OH group may occupy a position either ortho or para to the sulfur linkage.

The acyl halides which we employ as acylating agents may be of different kinds, i. e. having alkyl, aryl, alkoxyalkyl, aroxyalkyl, aralkyl, alkaryl, cycloalkyl, etc. radicals, such as, for example, butyryl chloride, caproyl chloride, lauroyl chloride, myristoyl chloride, stearoyl chloride, benzoyl chloride, amyl benzoyl chloride, amyl oxyacetyl chloride, naphthenoyl chloride, phenyl acetyl chloride, phenoxy acetyl chloride, phenyl stearoyl chloride and many others. The naphthenoyl chloride mentioned above is composed of a mixture of various cycloaliphatic acyl halides such as are prepared from naphthenic acids, a product of the petroleum industry.

The metal radicals which we introduce into the acyl phenol monosulfides to form salts thereof include those metal salt-forming radicals such as aluminum, lead, zinc, magnesium, copper, barium, strontium, cadmium, mercury, calcium, chromium, sodium, potassium and others. Metal salts of the acyl phenol monosulfides may be prepared by simply neutralizing the acyl phenol monosulfide with an appropriate metal oxide or hydroxide or by methods of double decomposition as illustrated in the specific examples.

Our new compounds range in color from straw colored to dark reddish-brown liquids and are of varying viscosity. They are extremely soluble in lubricating oils. They are also soluble in other solvents such as toluene, higher aliphatic alcohols, diethyl ether, carbon disulfide, carbon tetrachloride and the like. They are difficultly soluble in water.

The preparation of a number of these acyl phenol monosulfides and salts thereof will now be described in detail in the following examples. It should be understood, however, that this description is given merely for purposes of illustration and our invention is not to be limited to the particular compounds or the particular method of preparation described since other acyl phenol monosulfides may be employed without departing from the scope of the invention as set forth in the appended claims.

EXAMPLE 1

*2-stearoyl-4-amyl phenol monosulfide*

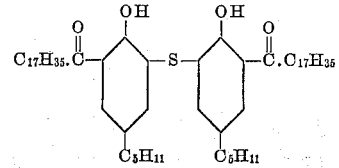

92 parts by weight of 4-amyl phenol monosulfide was dissolved in 70 parts of A. S. T. M. naphtha and 153 parts of stearoyl chloride added with stirring. The mixture was then heated under a reflux condenser with stirring for 30 minutes after which time the evolution of hydrogen chloride had subsided. After cooling, 23 parts of anhydrous aluminum chloride was added and the resulting mixture heated to refluxing temperatures with stirring. Refluxing and stirring were continued for 2 hours, at the end of which time very little hydrogen chloride was being evolved. The reaction mixture was then cooled and 200 parts of cold dilute hydrochloric acid added. The mixture was stirred thoroughly and 150 parts by weight of toluene added. The aqueous layer was then separated and the solvent layer washed once with warm, dilute hydrochloric acid and twice with hot water. The solvent was then evaporated and 2-stearoyl-4-amyl phenol monosulfide recovered as a reddish-brown liquid, readily soluble in gasoline and lubricating oil, but practically insoluble in water.

EXAMPLE 2

The barium salt of 2-stearoyl-4-amyl phenol monosulfide was prepared by dissolving 50 parts of the compound prepared in Example 1 in a solvent made up of 30 parts of ethanol and 60 parts of toluene. 9.5 parts by weight of barium hydrate was then added to the solution and the mixture heated at 80-120° C. with stirring until the barium hydrate had reacted and the water of neutralization had been expelled. Toluene was added from time to time to replace the solvent evaporated. After cooling, the solution was filtered from traces of inorganic barium salts and the solvent removed by evaporation. The barium salt thus obtained was an extremely viscous reddish-brown liquid believed to have the following formula:

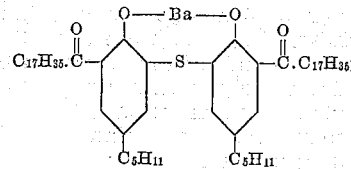

EXAMPLE 3

The heavy metal salts of 2-stearoyl-4-amyl phenol monosulfide, such as those of tin and zinc, may be conveniently prepared by double decomposition in an ethanol-toluene solution, between the sodium salt of 2-stearoyl-4-amyl phenol monosulfide and the appropriate metallic inorganic salt.

For example, 30 parts of 2-stearoyl-4-amyl phenol monosulfide was dissolved in a mixture of 30 parts of ethanol and 10 parts of toluene. 27 parts of a sodium ethylate solution, prepared by dissolving 23 parts of metallic sodium in 377 parts of ethanol, was added and the mixture warmed up to 75° C. until homogeneous. The temperature was then dropped to about 50° C. and 6.4 parts of stannous chloride, dissolved in 20 parts of ethanol, was gradually added with stirring. The mixture was then heated to 75° C. and 40 parts of toluene added. After cooling, the solution was filtered from sodium chloride and the filtrate evaporated. The stannous salt of 2-stearoyl-4-amyl phenol monosulfide remained as a viscous, reddish-brown product.

EXAMPLE 4

The aluminum salt of 2-stearoyl-4-amyl phenol monosulfide was prepared by dissolving 20 parts of the product prepared in Example 1 in 40 parts of toluene followed by the addition of 5½ parts of aluminum butylate. The mixture was stirred and heated at 110° C. for 30 minutes. The solvent was then evaporated, the last traces under reduced pressure, and the aluminum salt of 2-stearoyl-4-amyl phenol monosulfide recovered as a viscous, reddish-brown liquid.

EXAMPLE 5

*2-lauroyl-4-amyl phenol monosulfide*

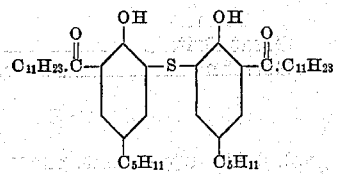

This compound was prepared by condensing 2 moles of lauroyl chloride with 1 mole of 4-amyl phenol monosulfide in the presence of 0.70 mole of anhydrous aluminum chloride following the procedure described in detail in Example 1. The product was a yellow colored liquid insoluble in water.

The various metallic salts of this compound were prepared in the same manner described in Examples 2 to 4.

EXAMPLE 6

*2-butyryl-4-amyl phenol monosulfide*

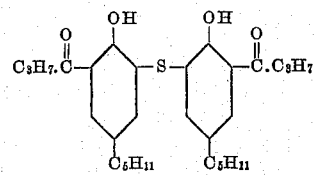

This product was prepared by condensing 2 moles of butyryl chloride with 1 mole of 4-amyl phenol monosulfide in the presence of 0.70 moles of anhydrous aluminum chloride. The product was a straw colored liquid insoluble in water. The various metal salts are prepared as previously described.

EXAMPLE 7

*2-stearoyl-4-methyl phenol monosulfide*

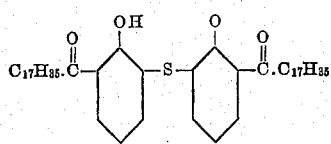

This compound was prepared by condensing 2 moles of stearoyl chloride with 1 mole of 4-methyl phenol monosulfide in the presence of 0.70 moles of anhydrous aluminum chloride by the procedure described in detail in Example 1. The product was a yellow liquid insoluble in water.

EXAMPLE 8

The barium salt of 2-stearoyl-4-methyl phenol monosulfide was prepared by neutralizing 60 parts of the monosulfide dissolved in 30 parts of ethanol and 60 parts of toluene with 21 parts of barium hydrate. The solution was then filtered and the filtrate evaporated. The product was a very viscous brownish-red material.

EXAMPLE 9

*6-stearoyl-2-amyl phenol monosulfide*

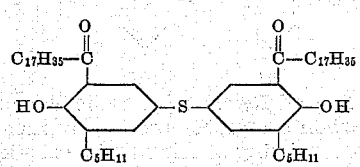

This compound was prepared by condensing 2 moles of stearoyl chloride and 1 mole of p-(2-amyl phenol) monosulfide in the presence of 0.70 mole of anhydrous aluminum chloride. The product was a reddish-brown liquid insoluble in water but easily soluble in gasoline and lubricating oil.

EXAMPLE 10

100 parts by weight of 6-stearoyl-2-amyl phenol monosulfide was dissolved in 70 parts of ethanol and 120 parts of toluene and neutralized with barium hydrate. The solution was then filtered and the solvent evaporated, leaving the barium salt of 6-stearoyl-2-amyl phenol monosulfide as a thick reddish-brown liquid.

EXAMPLE 11

*2-naphthenoyl-4-amyl phenol monosulfide*

This compound was prepared by condensing 143 parts of naphthenoyl chloride with 100 parts of 4-amyl phenol monosulfide in 60 parts of naphtha in the presence of 26 parts of anhydrous aluminum chloride following the general procedure described in Example 1. The product was a brown liquid insoluble in water, but easily soluble in gasoline and lubricating oil.

The barium salt of this compound was prepared by reacting 12 parts of barium hydrate with 30 parts 2-naphthenoyl-4-amyl phenol monosulfide dissolved in an alcohol-toluene solution.

EXAMPLE 12

*2-naphthenoyl-4-methyl phenol monosulfide*

This compound was prepared by condensing 104 parts of naphthenoyl chloride with 50 parts of p-cresol monosulfide dissolved in 50 parts of naphtha solution in the presence of 20 parts of anhydrous aluminum chloride. The product was a brown liquid practically insoluble in water.

The barium salt of this compound was prepared by heating 35 parts of 2-naphthenoyl-4-methyl phenol monosulfide, dissolved in 25 parts of ethanol and 50 parts of toluene, with 5 parts of barium hydrate. The product was a viscous, stiff, brown colored liquid.

What we claim is:

1. The barium salt of di-(2-stearoyl-4-amyl phenol) monosulfide.

2. The barium salt of di-(2-naphthenoyl-4-amyl phenol) monosulfide.

3. Metal salts of acyl phenol monosulfides of the formula

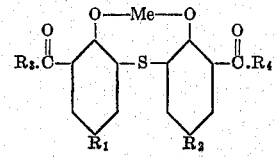

in which $R_1$ and $R_2$ are alkyl groups having 1 to 20 carbon atoms, $R_3$ and $R_4$ are members of the group consisting of alkyl and cycloalkyl radicals, and Me is a divalent metal.

4. Acyl phenol monosulfides of the formula

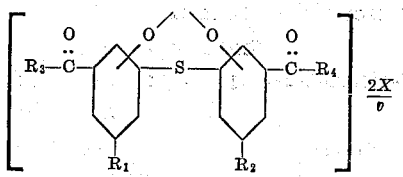

in which $R_1$ and $R_2$ are alkyl radicals containing 1 to 20 carbon atoms, $R_3$ and $R_4$ are members of the group consisting of alkyl and cycloalkyl radicals, X is a salt-forming metal and $v$ is the valence of X.

5. Acyl phenol monosulfides of the formula

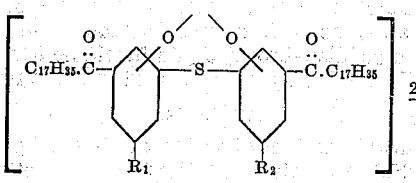

in which $R_1$ and $R_2$ are alkyl radicals having 1 to 20 carbon atoms, X is a salt-forming metal and $v$ is the valence of X.

6. Acyl phenol monosulfides of the formula

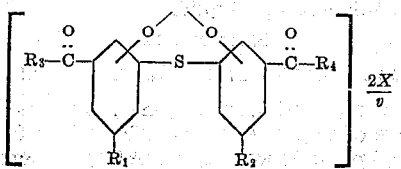

in which $R_1$ and $R_2$ are alkyl radicals containing 1 to 20 carbon atoms, $R_3$ and $R_4$ are naphthenyl radicals, X is a salt-forming metal and $v$ is the valence of X.

ELMER W. COOK.
WILLIAM D. THOMAS, Jr.

REFERENCES CITED

The following references are of record in the file of this patent:

UNITED STATES PATENTS

| Number | Name | Date |
|---|---|---|
| 2,033,545 | Ralston | Mar. 10, 1936 |
| 2,174,248 | Mikeska | Sept. 26, 1939 |
| 2,195,539 | Mikeska | Apr. 2, 1940 |
| 2,331,448 | Winning | Oct. 10, 1943 |

FOREIGN PATENTS

| Number | Country | Date |
|---|---|---|
| 1,881 | Great Britain | 1904 |
| 56,003 | Germany | Mar. 10, 1891 |

OTHER REFERENCES

Beilstein, vol. 6 1st supplement, pages 78–79.